United States Patent
Steckler et al.

[19]

[11] Patent Number: 5,936,153
[45] Date of Patent: Aug. 10, 1999

[54] APPARATUS AND METHOD FOR TESTING BRAKE ACTUATOR UNITS USED IN RAILROAD CARS

[75] Inventors: Adam Steckler, Newark; Charlie Pope; Norris Macklin, both of Wilmingtion; John J. Hannaford, Newark, all of Del.

[73] Assignee: National Railroad Passenger Corporation, Washington, D.C.

[21] Appl. No.: 08/885,816

[22] Filed: Jun. 30, 1997

[51] Int. Cl.⁶ .................................................. G01M 17/08
[52] U.S. Cl. .................................................. 73/121; 73/39
[58] Field of Search .................................. 73/121, 39, 46, 73/47, 49.1, 49.7, 52

[56] References Cited

U.S. PATENT DOCUMENTS

| | | |
|---|---|---|
| 2,103,305 | 12/1937 | Thomas . |
| 3,169,391 | 2/1965 | Spalding . |
| 3,596,500 | 8/1971 | Rees . |
| 3,727,453 | 4/1973 | Rees ............................................. 73/39 |
| 3,872,711 | 3/1975 | Atkinson et al. ........................... 73/39 |
| 3,945,684 | 3/1976 | Chellis . |
| 4,307,604 | 12/1981 | Domitter . |
| 4,440,015 | 4/1984 | Hann ......................................... 73/121 |
| 4,513,604 | 4/1985 | Frantz et al. ................................ 73/39 |
| 4,811,252 | 3/1989 | Furuse . |
| 4,847,770 | 7/1989 | Kane et al. ................................ 73/129 |
| 5,285,190 | 2/1994 | Humphreys et al. . |
| 5,293,777 | 3/1994 | Reid et al. . |
| 5,446,389 | 8/1995 | Lenz .......................................... 73/116 |
| 5,503,011 | 4/1996 | Hart et al. ................................. 73/121 |
| 5,559,281 | 9/1996 | McKay et al. ............................ 73/121 |

*Primary Examiner*—George Dombroske
*Assistant Examiner*—Eric S. McCall
*Attorney, Agent, or Firm*—Lowe Hauptman Gopstein Gilman & Berner

[57] ABSTRACT

An apparatus for testing tread and disk brake actuator units for use in railway cars in an overhaul backshop environment is disclosed. The apparatus includes a test bench on which multiple test fixtures are mounted to simultaneously receive and test a like number of brake actuator units. Each test fixture is provided with differently sized sets of brackets to enable respective simultaneous mounting of different brake actuator units made by a variety of manufacturers. The test bench includes a series of solenoids and directional valves operated by a programmable logic controller to supply low, high and maximum pressure air to the actuator units to perform pneumatic leakage, applied force, and slack adjuster travel tests. Pneumatic leakage detection is performed through an automatic test removing human subjectivity from the test process. A diagnostics panel provides functional information on the status of the equipment on the test bench. A control panel enables the test operator to select between automatic and manual modes of operation and to observe lights indicative of test type, cycle and pass versus failure mode following test completion.

23 Claims, 7 Drawing Sheets

APPARATUS AND METHOD FOR TESTING BRAKE ACTUATOR UNITS USED IN RAILROAD CARS

TECHNICAL FIELD

The present invention relates generally to testing brake actuator units used in railroad cars and, more particularly, to a test bench for testing multiple brake actuator units made from a variety of manufacturers.

BACKGROUND ART

Passenger railroad cars are supported on wheeled trucks located beneath opposite ends of each car. Each truck includes at least two pairs of wheels with each wheel pair being respectively interconnected with an axle at opposite ends thereof. A separate disc brake assembly and a separate tread brake assembly is mounted to the truck adjacent each wheel in a well known manner to impart a braking force to slow or stop the train.

Both the disc and tread brakes utilize brake actuator units which are air actuated to extend piston and cylinder controlled disc and tread brake components into braking contact with the axle and wheels, respectively. The brake units also each include a slack adjuster mechanism that automatically adjusts the position of the brake components to account for wear during use.

The aforesaid brake assemblies are pressure tested frequently (e.g. daily) to ensure operability. If an assembly fails, it is immediately replaced and returned to a backshop overhaul environment for overhaul and retesting. In addition, at less frequent intervals (e.g. every 3–4 years) as mandated by appropriate association or government control (e.g. The Association of American Railroads and the Federal Railroad Administration), the passenger coach cars are overhauled in the backshop environment, where all of the car components are replaced with new or reconditioned components.

During the overhaul process, in the past, the overhauled (or new) tread brake and disc brake actuator units were subjected to testing for pneumatic leakage in accordance with manufacturer supplied guide lines before being mounted back on to the truck. Conventionally, this testing has occurred by bolting the brake actuator unit to a test stand and then applying pressurized air to extend the actuator piston. A pressure gauge was used to check manually for pneumatic leakage as determined by visual inspection of the gauge needle by the test operator for pressure drop within a certain amount of time.

Since tread and disc brakes with their associated brake actuator units are manufactured by a variety of different manufacturers, the vertical support section of the test stand must be tailored to attach to the particular shape of the actuator cylinder casing. Since each manufacturers' brake actuator unit is different from other manufacturers' units, the same test stand cannot be used to test the other manufacturers' units. Differently configured test stands are respectively required to test the actuator units of the different manufacturers.

The aforesaid test protocol for testing for pneumatic leakage is fraught with human subjectivity and error since the test operator is required to observe small needle pressure drops (e.g. half pound or less) over a relatively long period of time. (e.g. two minutes). Since the small pressure drop manifests itself as a slight needle fluctuation on the pressure gauge, the possibility of human error in failure to detect a slight fluctuation is high.

Additionally, the inability to test a plurality of brake actuator units simultaneously unnecessarily prolongs and considerably slows down the overhaul process of the railway cars, particularly in a backshop overhaul environment.

It is accordingly an object of the present invention to simultaneously check a plurality of brake actuator units in a reliable, rapid and repeatable manner.

Another object is to test brake actuator units made by different manufacturers on the same test stand.

Still a further object is to eliminate human subjectivity and error in determining whether a brake actuator unit under test experiences air leakage.

Yet another object is to provide a test stand that performs a multitude of tests.

A further object is to provide a test stand for performing one or more tests on disc brake actuator units during an overhaul or replacement process.

SUMMARY OF THE INVENTION

Apparatus for testing brake actuator units for use in railway cars, in accordance with the present invention, comprises a test stand and a plurality of differently sized sets of brackets to which a brake actuator unit is mounted to one of the sets. By providing different sized sets, the test stand is capable of advantageously supporting brake actuator units of different manufacturers. Control means is provided for applying pressurized air to the brake actuator unit and monitoring for pressure drop indicative of air leakage within a cylinder of the actuator unit. Means, responsive to a signal from the control means, is provided for identifying whether a predetermined amount of leakage is present.

Preferably, the control means includes means for selectively applying a predetermined low pressure and a predetermined high pressure to the cylinder to establish a low pressure leakage test and a high pressure leakage test, respectively. It is also within the scope of this invention to utilize the selective applying means to apply a predetermined maximum pressure of air to establish a maximum leakage test.

In the preferred embodiment, the selective applying means includes an air circuit having a source of pressurized air connected to the cylinder through a pressure regulator and a directional valve which is moveable preferably between open, closed and exhaust positions.

The control means also preferably includes delay timer means enabling the supplied air to adjust to ambient temperature before active testing occurs.

A plurality of the test stands are preferably provided on the same apparatus to simultaneously test a plural number of brake actuator units for pneumatic leakage. The control means is configured so that selected ones of the test fixtures and brake actuator units thereon can be subjected to testing.

The control means preferably includes a pressure transducer for monitoring the pressure supplied to the cylinder of the selected unit being tested. The pressure transducer is connected to a programmable logic controller (PLC) of the control means which actuates the identifying means when predetermined leakage is present.

The differently sized sets of brackets each preferably include different pairs of upper and lower brackets positioned on the test stand for direct alignment and attachment with mounting locations formed on a housing of the brake actuator unit being tested.

The apparatus according to the invention preferably also comprises a load cell mounted to the test stand in operative alignment with a cylinder actuated component of the brake actuator unit to measure application of force of the component under extension caused by the pressurized air. In this manner, it is possible to ensure the operability of the force transmission components within the actuator unit by direct measurement of applied force.

The test bench also features a gauge and an indicator connected to the test stand and the cylinder actuated component to measure slack travel of the component.

In the preferred embodiment, the main components of the test apparatus consist of a diagnostic panel, a control panel, and the bench containing, for example, four fixtures that are universally designed to accept brake actuator units from a variety of manufacturers. Test on the brake units are performed in a manual hand mode as well as an automatic mode. Any combination of the four units, from one unit to all four units, may be tested simultaneously. This bench is a universal design since it can test leakage on an air actuated device as well as force applied by using interchangeable mechanical mounting devices.

The diagnostics panel preferably provides functional information on the status of the equipment on the test bench. Lights are utilized to indicate positions of the directional valves, exhaust and high pressure and low pressure and maximum pressure solenoids, whether a low pressure or a high pressure test is in progress and when the automatic test is complete.

The control panel preferably includes digital meters to indicate pressure and leakage of each actuator being tested. Lights are also provided to indicate automatic test results for each actuator. Selection buttons are used to activate and deactivate any combination of the four test actuators and a selector switch is provided to enable test operator selection of either an automatic mode or hand mode of operation. There are also automatic start and stop test buttons and a pressure selector switch moveable between off, low, high and maximum pressure test conditions. There is also provided a push to test button to test the operability of all lights on the panels. A main system start/stop button controls main power to the test bench.

Inside the control panel enclosure there is the programmable logic controller (PLC). This unit is the computer that controls all devices in the test system and responds to all user actions. It is programmed to perform the application required. The control panel enclosure also contains low, high and maximum pressure pneumatic regulators.

The test bench further includes the four custom design fixtures, in the preferred embodiment, to accept brake actuators from a variety of manufacturers. These fixtures contain load cells to measure force generated by individual units as well as measuring devices to test slack adjuster movement. Under each fixture is mounted a multi-directional valve, pressure transducer, and other associated plumbing and electrical hardware for connection to the source of pressurized air through the pneumatic regulators. A coil hose extends to the top of the bench with a quick disconnect for easy attachment to the units being tested.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 6:
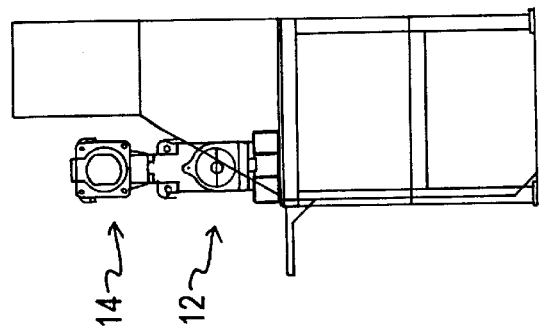
FIG. 6 is a right side elevational view of the apparatus of FIG. 4.
Figure 5:
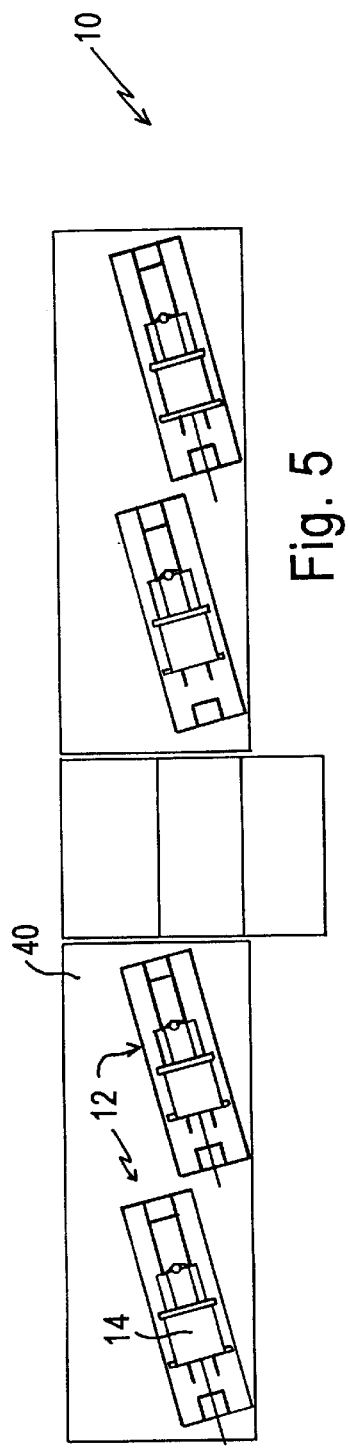
FIG. 5 is a top plan view of the apparatus of FIG. 4.
Figure 1:
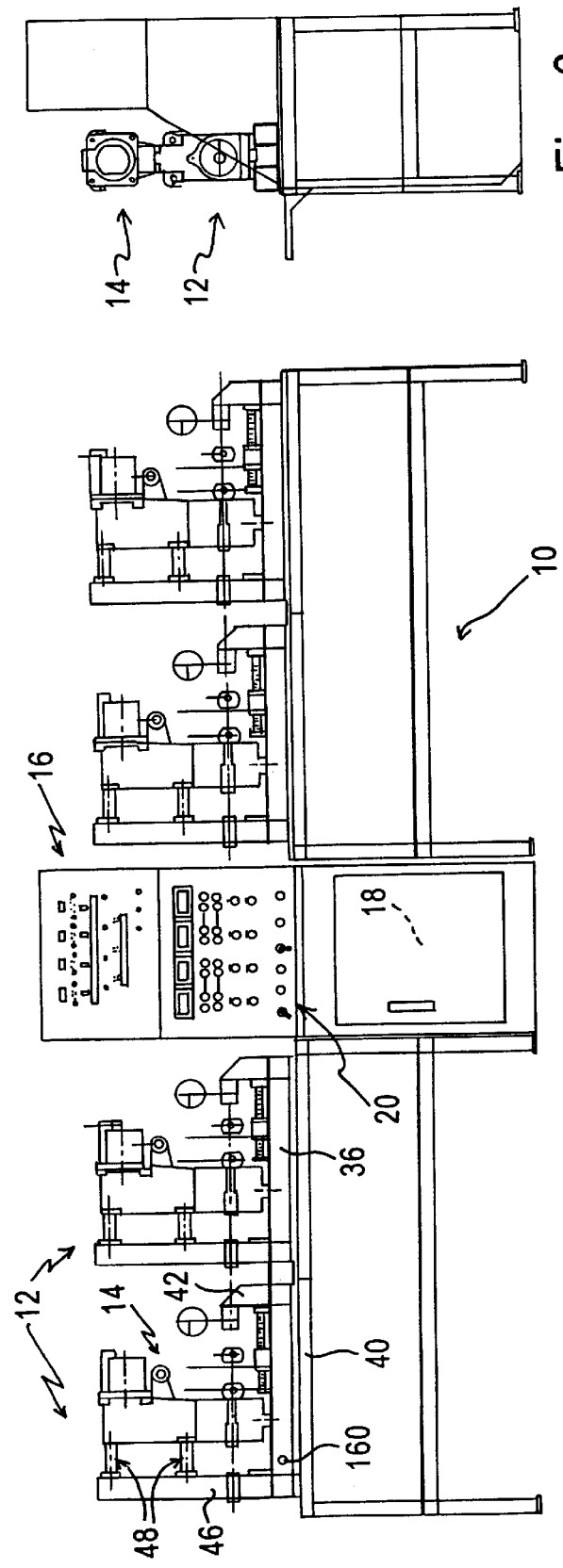
FIG. 1 is a front elevation view of the overall test bench apparatus in accordance with a preferred embodiment of the invention.

Referring first to FIG. 1, a test bench 10 according to the invention is provided with a plurality (or one) of mounting fixtures, generally designated with reference numeral 12, universally designed in the unique manner described below to accept brake actuator units 14 from a variety of manufacturers. A test operator, through unique interaction with a control panel 16 (FIG. 7), can simultaneously test up to four brake actuator units 14 for pneumatic leakage, applied force and slack adjuster travel. Pneumatic leakage is performed through an automatic test removing human subjectivity from the test process through the application of using a Programmable Logic Controller (PLC) 18. Tests on the brake units 14 are performed in a manual hand mode as well as an automatic mode through control panel 16 in the unique manner described below. Any combination of the four units 14, from one unit to all four units, all of which may be from different manufacturers, may be tested simultaneously. Test bench 10 is of a universal design since it can test leakage on any air actuated device as well as force supplied by using interchangeable mechanical mounting devices described more fully below. A diagnostics panel 20 (FIG. 8) provides functional information on the status of the equipment 14 on the test bench 10, also as described infra.

Testing with the invention advantageously occurs in a backshop overhaul environment wherein a relatively large number of tread and disk brakes 14 of a railroad car are overhauled and must be tested in a rapid and reliable manner before remounting to the trucks carrying the wheels.

Figure 4:
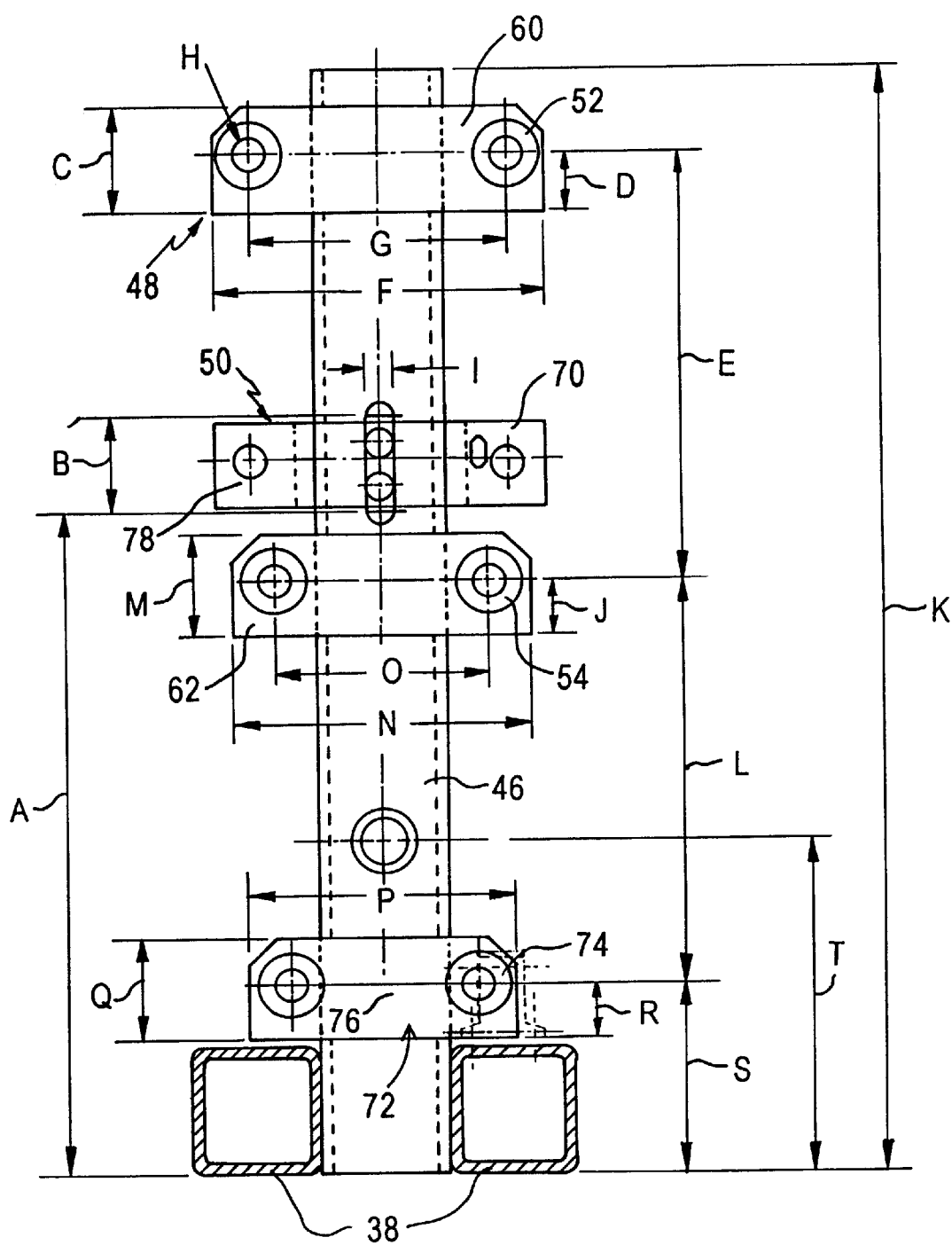
FIG. 4 is a sectional view taken along the line 4—4 of FIG. 1 without a brake actuator unit mounted thereto.

FIG. 4 is an illustration of one of test fixtures 12 to which is mounted, for purposes of explanation, a WABCO GB 4-½ Amfleet II tread brake 14. This type of tread brake unit 14 is comprised of a cast housing having upper and lower generally rectangular housing sections 22 and 24 of integral and unitary construction. The upper section 24 is adapted to receive a cylinder and a piston and rod assembly 26 (not shown in detail) which is interconnected to a brake head assembly 28 in a known manner through a lever assembly 30 within the housing and a hanger (removed for simplicity of view) that is responsive to pneumatic extension of the piston rod to advance the brake head in extension and retraction modes. In the FIG. 4 illustration, the brake head 28 is depicted as being attached to a bushing 32 formed at one end of a slack adjuster screw 34 which is received in the lower section 24 of the rectangular housing for connection to a known slack adjuster mechanism therein that automatically adjusts for slack created in brake travel as a result of brake shoe wear. The brake head 28, which is normally removed when the tread brake unit 14 is mounted to the test fixture 12, is shown in phantom line in FIG. 4. Otherwise, during piston extension and retraction, the slack adjuster screw 34 and the bushing 32 at the front end thereof reciprocates horizontally along an axis L depicted in the drawing.

The fixture 12 includes a test frame having a horizontally extending mounting section 36 preferably formed from a pair of parallel lengths of square hollow tubing 38 bolted to the top of a bench 40 (FIG. 1). The horizontal lengths of tubing 38 are interconnected together, at distal ends 40 thereof, with a short length of square hollow tubing 42 extending vertically to support a load cell 44 mounted at an upper end thereof. The proximal ends of horizontal tubing 38 are also interconnected with a longer length of square hollow tubing 46 extending vertically to support differently sized and arranged sets of brackets 48 and 50 to which different styles of brake actuators may be mounted on the test fixture 12. For example, with particular reference to FIGS. 2 and 4, the vertical support 46 includes the first set 48 of mounting brackets in the form of an upper pair 52 and a lower pair 54 of vertically spaced stand-off tubes configured for alignment with correspondingly located mounting ears 56 formed adjacent the rear face 58 on the upper rectangular section 22 of the brake housing. The pair of the upper stand-off tubes 52 are welded at rear ends thereof to a mounting bar 60 that is either fixedly or vertically slidably attached to the vertical support tubing 46. The lower pair of stand-off tubes 54 are preferably identical to the upper pair 52 and likewise are secured to a similar mounting bar 62 that may be bolted or welded or adjustably secured at selected vertical positions to the vertical support 46 through a mounting bolt engaging a slot formed on a vertical end face of the upright support.

Figure 2:
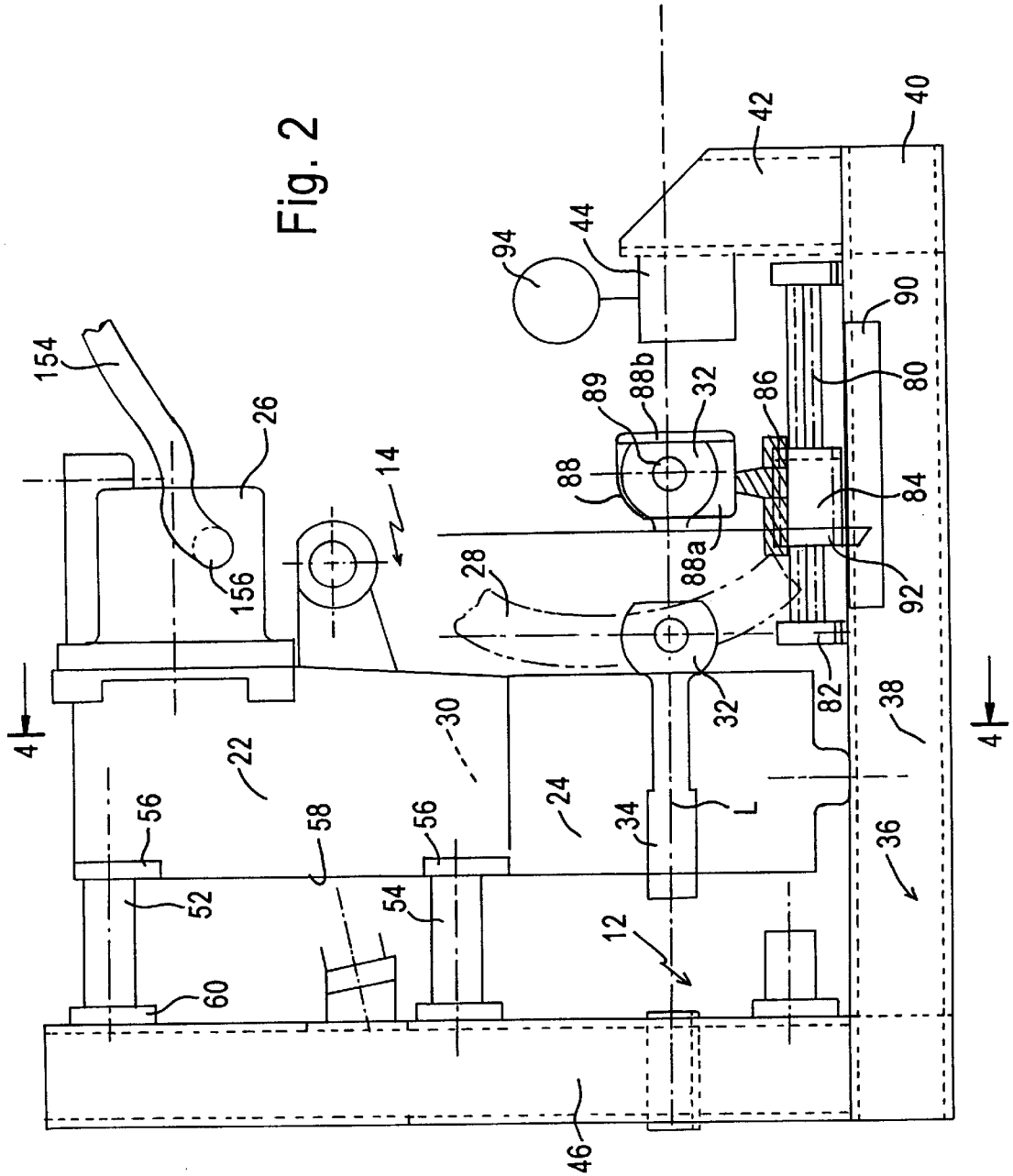
FIG. 2 is a side elevation view of a test fixture in the test apparatus of the present invention.
Figure 3:
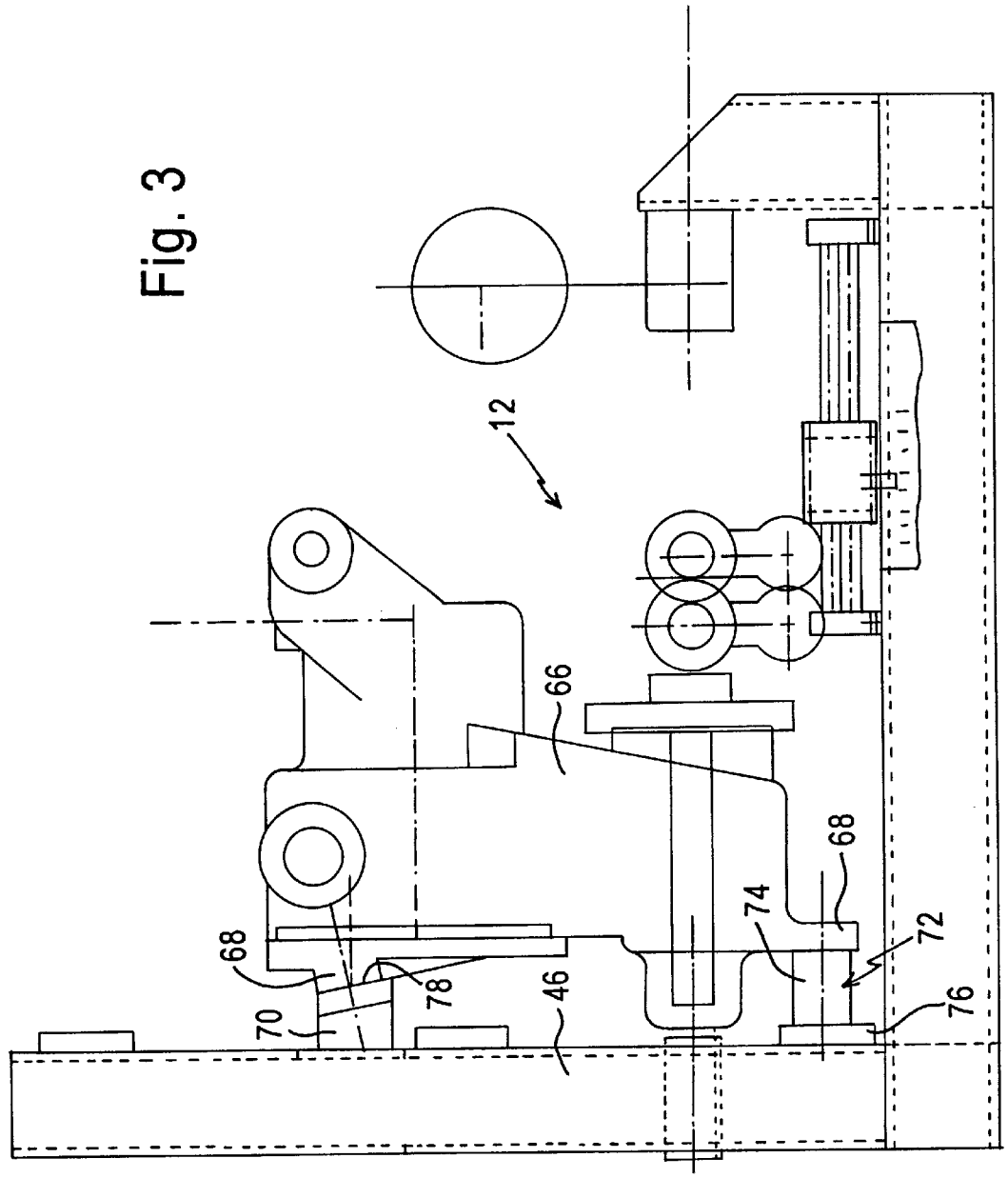
FIG. 3 is similar to FIG. 2 but depicting a different type of brake actuator unit than the type depicted in FIG. 1.

FIG. 3 is an illustration of the test fixture 12 of FIG. 2 with a KNORR PR-5 Amfleet 1 tread brake mounted thereto for testing. Although functionally similar to the WABCO tread brake of FIG. 2, the housing 66 is differently configured and therefore the mounting ears 68 are located at different positions relative to the mounting locations 56 of the WABCO unit. For this reason, referring to FIGS. 3 and 4, there is provided the second set 50 of upper and lower mounting brackets 70 and 72 arranged to mount the KNORR tread brake unit to the fixture 12 in the manner depicted in the drawing. The lower mounting bracket 72 also features a pair of parallel stand-off tubes 74 extending horizontally from opposite ends of a mounting bar 76 fixedly or slidably secured to the vertical support 46. The upper mounting bracket 70 has inclined mounting support surfaces 78 to which mounting ears 68 of housing 66 are bolted.

The dimensional relationships between the component bracket parts of the differently sized bracket sets 48, 50 are depicted in the table below (see FIG. 4 for corresponding reference letter designations) to identify desired spacing relationships to accommodate the WABCO and KNORR tread brake units 14 described hereinabove. It is to be understood that other brackets may be added to the vertical support 46 to accommodate yet other types of manufactured tread brake units.

| | INCHES |
|---|---|
| A | 15.88 |
| B | 2.5 |
| C | 2.50 |
| D | 1.38 |
| E | 10.00 |
| F | 7.75 |
| G | 6.00 |
| H | .81 |
| I | 6.40 |
| J | 1.38 |
| K | 26.0 |
| L | 9.69 |
| M | 2.50 |
| N | 7.00 |
| O | 5.00 |
| P | 6.25 |
| Q | 2.50 |
| R | 1.38 |
| S | 4.50 |
| T | 7.95 |

Continuing with the description of the test fixture 12, with reference to FIG. 2, the test bench horizontal mounting section 36 includes a pair of parallel and laterally spaced horizontal slide shafts 80 mounted respectively to the horizontal tubing 38 through a pair of upright supports 82 fixedly connected to the tubing. A twin shaft bearing 84 (e.g. a Thompson bearing) is slidably mounted to the shafts 80 to support an adapter block 86 attached to a top surface thereof. The adapter block 86 includes an upwardly extending adapter section 88 rotatably secured to lower block 86 and having a vertical axis of rotation. The upper section 88 is actually a pair of clevis arms 88a between which is received bushing 32 that is secured thereto with a clevis pin 89 extending horizontally in coplanar alignment with the longitudinal axis L of the slack adjuster screw 34 and the load cell 44. A vertically oriented load cell contact plate 88b is attached to clevis arms 88a in facing relationship to load cell 44. A scale 90 is fixedly mounted to one of the horizontal tubings 38 and cooperates with a pointer 92 attached to the bearing 84 for movement therewith to allow for manual measurement by the test operator of slack travel.

During normal use of the brake unit 14, it should be understood that the bushing 32 is normally attached to the brake shoe mounting block 28 depicted in phantom line in FIG. 2. However, for test purposes during mounting on the test bench 10, the brake shoe mounting block 28 is removed from the bushing 32 and the bushing is captured within opening 89 formed in the adapter block. It is to be understood that when the piston rod is extended during testing, the bushing 32 is extended concurrently with the slack adjuster screw 34 to contact the load cell 44 to which a test gauge 94 is connected to enable the test operator to measure applied force.

It will be understood that the adapter block 86, 88 is custom made for each different type of activator 14. Accordingly, the adaptor 86, 88 for connecting the slack adjuster screw bushing 32 to the slide bearing 84 may be different for each particular manufacturers brake actuating unit to accommodate the different shape and possibly the different elevation of the bushing on the test stand to ensure proper contact with the load cell and movement of the slide bearings during piston extension under test.

In a broad descriptive sense, therefore, the test fixtures 12 of the invention are provided with different types of brackets 48, 50 in order to accommodate different manufacturer's equipment being tested in the unique manner described above so that the mounting ears 56, 68 formed on the equipment housings 22, 66 can be easily bolted to the vertical support 46 of the test fixture 12 to precisely locate the stroke axis L of the slack adjuster screw 34 and bushing 32 thereon in coaxial alignment with the load cell 44. Custom design adapter components 86, 88 such as described above are used to connect the slack adjuster screw bushing 32 to the slide bearings 84 to ensure proper movement of the pointer 92 along the scale 90 to measure slack travel.

Figure 7:
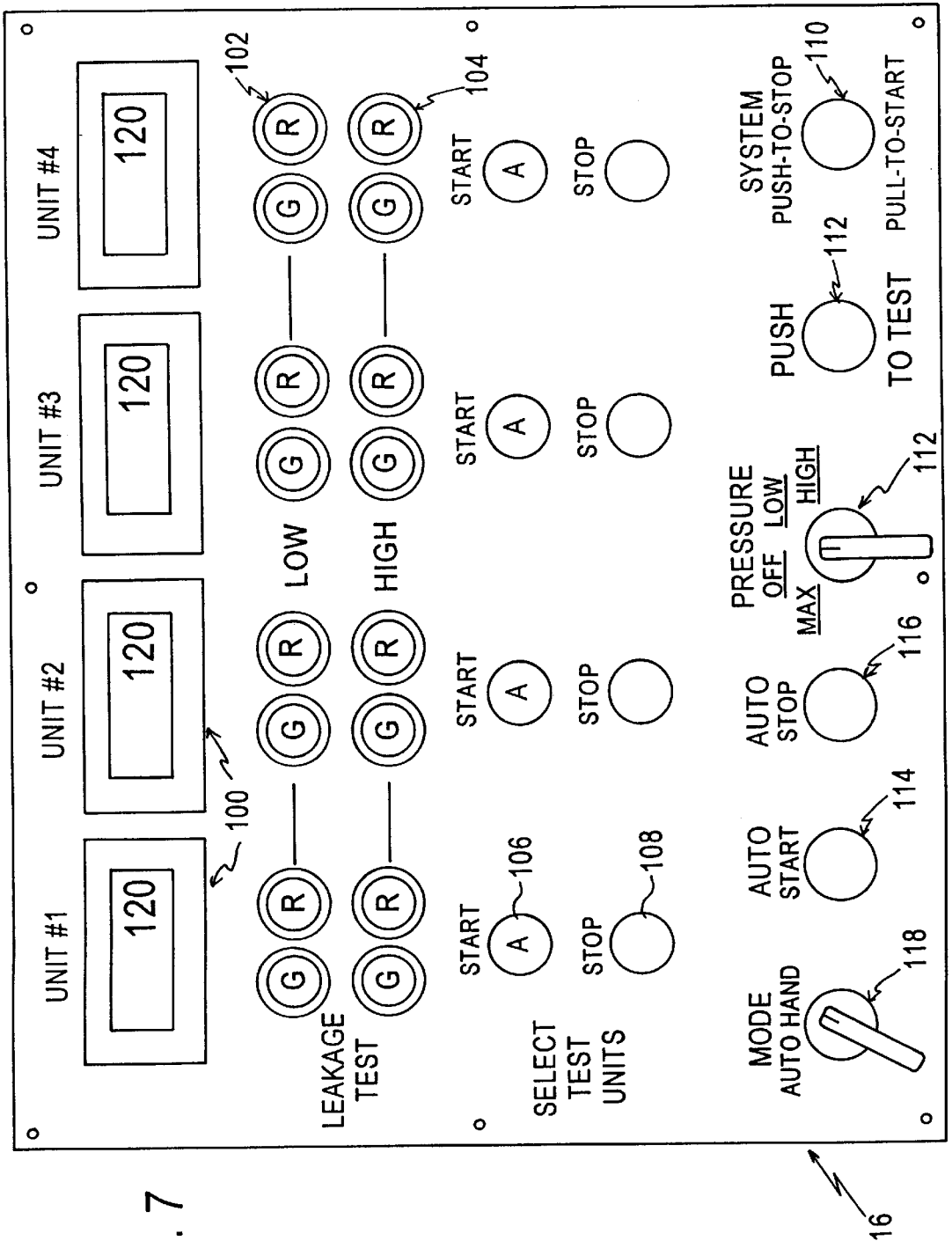
FIG. 7 is a plan view of the control panel of the apparatus.

FIG. 7 is an illustration of the control panel 16 wherein the top row includes a plurality of preferably digital meters 100, one for each of the test fixtures 12, for displaying the current pressure in the air cylinder 26 of the unit 14 under test. The pressure is preferably displayed in pounds per square inch and is detected with a pressure transducer 152 which sends an electrical signal to meter 100. The meter converts the signal into a digital display and has a predetermined set point for allowable leakage. If the allowable leakage is exceeded, the meter 100 sends a signal to the PLC 18 which responds by activating the appropriate red and green lights. There are two rows of leakage test lights 102 and 104 beneath each unit meter 100. The first row 102 includes pairs of green and red lights G, R interfacing with PLC 18 to inform the test operator whether a particular unit has passed or failed a low pressure leakage test. Preferably, green means pass, red means fail. The lower row 104 of test light pairs are respectively interfaced with PLC 18 to alert the test operator if the unit has passed or failed the high pressure test.

Beneath the leakage test lights 102, 104 are a series of pairs of select test unit buttons 106, 108. There is a series of start and stop buttons for each unit 14. In order for a particular unit on a particular test fixture 12 to be included in a test, either manual or automatic, described more fully below, the start button 106 associated with a particular test fixture must be hit. Likewise, a test fixture may be disabled from testing by pressing the stop button 108. In that mode, pressurized test air would not be supplied to the disabled test fixture.

The bottom row of control panel 16 includes a main power supply button 110 which is preferably pushed in to disrupt the power to the test bench 10 and pulled out to supply power. Adjacent the power supply button 110 is a 'PUSH TO TEST' button 112 which, when depressed, illuminates all lights on the control panel 16 and on the diagnostic display 20 discussed below. The purpose of the PUSH TO TEST button 110 is to check that all bulbs are functioning properly and not burned out. A pressure selection switch 112 which is used in the manual mode can be set between OFF-LOW-HIGH and MAX positions. The operator must hold the knob 112 in the MAX position to supply high maximum pressure air to the cylinders 26. Thereafter, the knob 112 may be turned to and left in, the LOW and HIGH positions where the units can be operated manually.

To use the test fixture 12 in an automatic mode, the pressure switch 112 must be turned to the OFF position. Thereafter, the two adjacent buttons 114 and 116 are used to start the automatic mode and then stop the automatic mode. To begin the automatic test, the auto start button 114 is depressed. When the test is completely finished as indicated on the diagnostics panel 20 discussed below, the automatic STOP button 116 is depressed. It is to be noted that the switch 118 to the far left on the bottom row is the mode switch between automatic and hand modes. The test bench 10 is left in the hand mode to measure the slack adjuster travel and its ability to function as discussed below. The hand mode is also used to measure force application as supplied to the load cell 44 by the actuator unit 14 as described above. The invention may be switched into the automatic mode to perform an automatic leakage test on the units 14.

Figure 8:
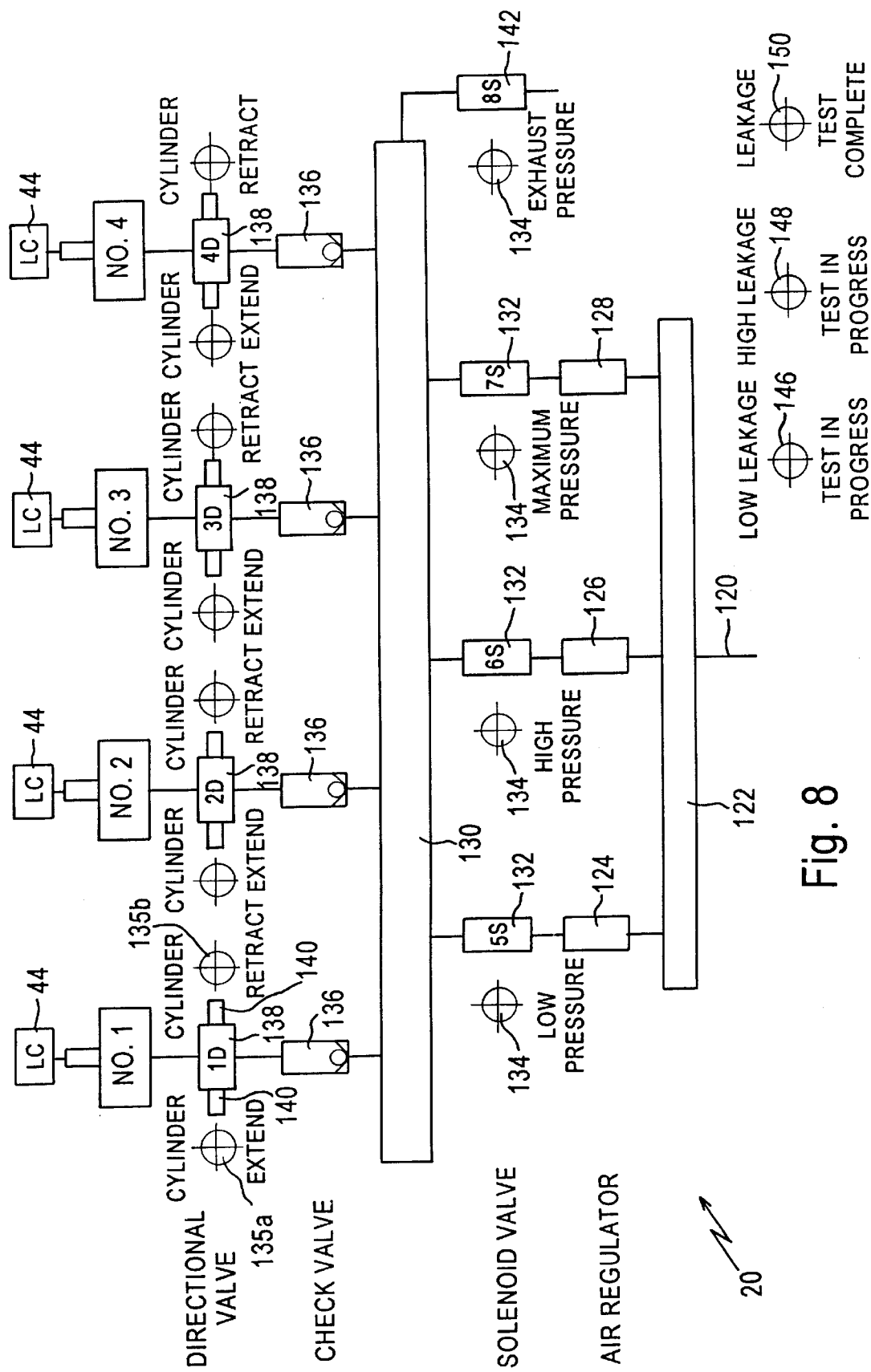
FIG. 8 is a plan view of a diagnostic panel of the apparatus.

FIG. 8 is a schematic diagram depicting the pneumatic circuitry and valving arrangements controlling the flow of pressurized air into and out of the test cylinders 26 of the units 14 under test. This air flow diagram is also representative of the diagnostics panel display 20 appearing adjacent the control panel display 16. The reference numerals used hereinbelow are used to describe both structure as well as display indicia representative of structure.

Air (preferably shop air supplied at about 100 psi) is supplied from an inlet line 120 into a high pressure manifold 122 which functions as a high pressure air reservoir. The air is then directed through one of a low pressure regulator 124, high pressure regulator 126 or a maximum pressure regulator 128 into a second delivery manifold 130 under a suitable pressure depending on which one of the solenoid valves 132 is in the open position. A light 134 on the diagnostics panel display 20 indicates the type of pressurized air being supplied to the units 14. These solenoid indicator lights become lit to indicate which of the solenoids 132 is energized to allow air to pass therethrough.

Figure 9:
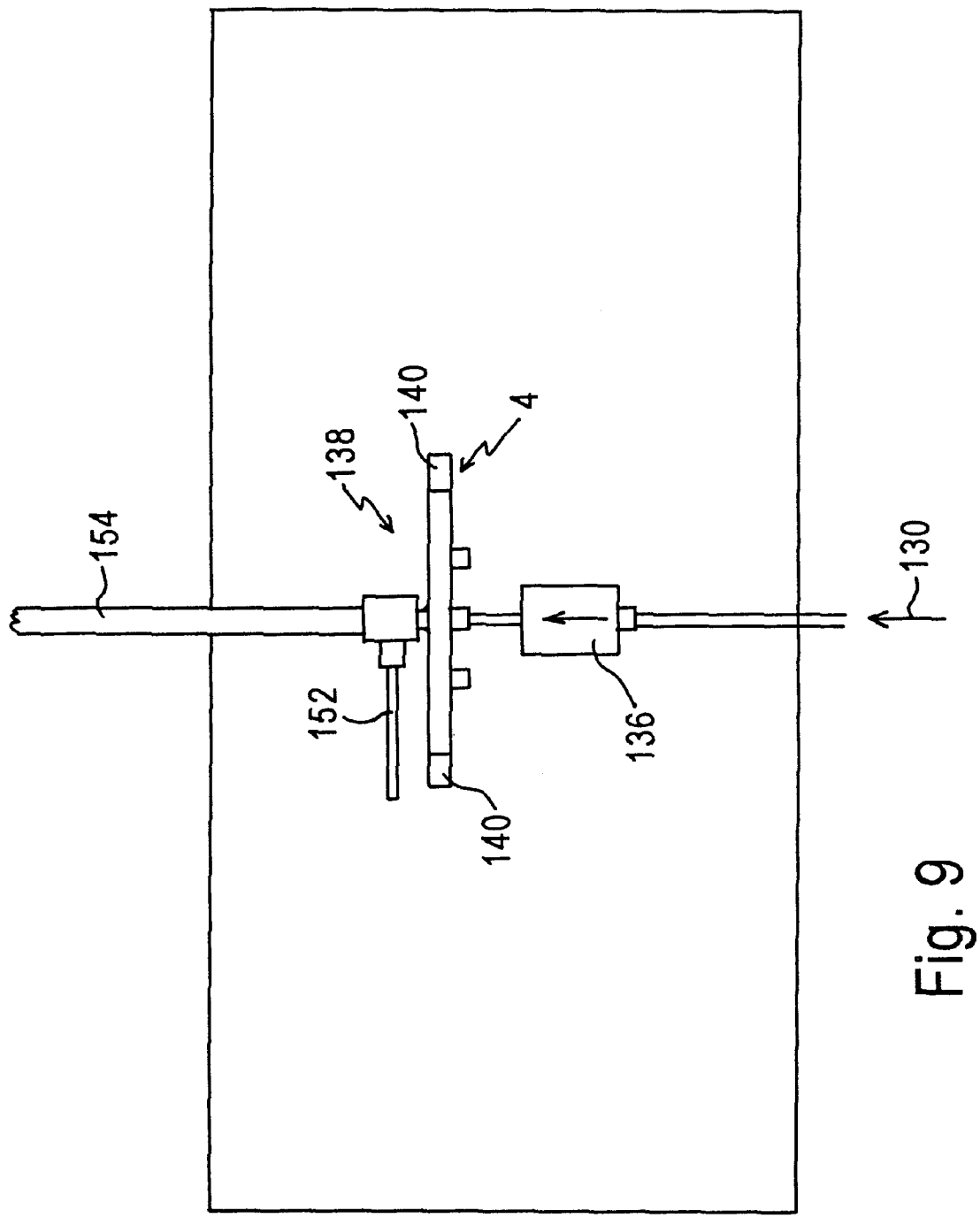
FIG. 9 is a schematic view of a part of the air circuit arrangement for supplying pressurized air to the actuator units under test.

Either high, low or maximum pressure air is then supplied to the appropriate test fixture(s) 12 through one of check valves 136 and a directional valve 138 (preferably a 4-way directional valve with a solenoid 140 on each end thereof) which is solenoid operated to either block the entry of air into a particular test fixture, admit pressurized air to the fixture, or exhaust pressurized air from the fixture. A representative valving arrangement is depicted in FIG. 9. The upstream side of the air supply (i.e. upstream of the check valves 136) can also be exhausted through a solenoid exhaust valve 142 after a particular test has been conducted.

In FIG. 8, the series of load cells 44 respectively associated with each of the test fixtures 12 is also illustrated. The slack adjustment screw bushing 36 to which the brake head 28 is adapted to be attached is extended by the pressurized air being supplied to the test fixture 12. A light 135*a* or 135*b* indicates whether the cylinder 26 is extended or retracted, respectively. Although neither the control panel 16 nor diagnostics panel 20 provide any readout of force application against the load cell 44, i.e. the readout is manually displayed on the test gauge 94 for visual inspection by the test operator, it is to be understood that the invention may be modified to digitally or otherwise display a force application reading as well.

Still with reference to the diagnostics panel 20 displayed in FIG. 8, there are three additional indicator lights 146, 148 and 150 in the lower right-hand corner. The low leakage light 146, if blinking, is representative of the low leakage test being applied to the test units 14. The blinking condition indicates that pressurized air has been already supplied to the test unit cylinders 26 and is waiting to stabilize to ambient temperature in the cylinder which requires a predetermined time interval of, for example, 30 to 40 seconds, in order to provide a stable pressure reading. Once the temperature is stabilized as determined by the predetermined time interval, the blinking light becomes a solid light which indicates that the actual test is in progress. The high leakage light 148 is actuated when the high pressure test is being conducted. If the "leakage test complete" light 150 illuminates, this signifies that the leakage test has been completed.

Referring back to the control panel display 16 of FIG. 7, the meter displays 100 are representative of the input pressure (i.e. LOW, HIGH, or MAXIMUM) being supplied to a particular test fixture 12 and, following the leakage test, a green or red leakage test light 102 or 104 is displayed for each tested unit depending on whether the high or low pressure leakage test has detected a failure. The air pressure being displayed is detected by a transducer 152 (FIG. 9) that is electrically connected to the display 100 which is capable of detection of leakage in tenths or hundredths of a pound of pressure to determine the presence or absence of high and low pressure leakages. If leakage is detected by the meter, the PLC 18 is alerted and provides an appropriate response to the diagnostic panel.

The following summarizes the operation procedures for conducting the general tests of force application, slack adjuster travel measurement and leakage:

1. Bring actuator units 14 (to be tested) to the test bench 10 and mount them to the fixtures 12, securing with the proper special locking bolts based on the manufacturer of the unit. The air hose 154 (see FIGS. 2 and 9) is connected to the pot 156 on the actuator unit 14. Also, the adapter 86, 88 is attached to the bushing 32 of the actuator unit 14 to apply the force generated by the unit onto the load cell 44 for measurement. Note the fixtures are labeled from "1" to "4" in FIGS. 7 and 8.
2. Activate the units 14 on the control panel 16 by pressing the corresponding start buttons 106.
3. Turn "MODE" switch 118 to "HAND".
4. Turn "PRESSURE" switch 112 to "MAX" and hold for 10 seconds. Check to ensure unit 14 does not catastrophically fail.
5. Turn "PRESSURE" switch 112 to "LOW". Below each fixture 12 is a button 160 (FIG. 1). Hold the button 160 for 3 seconds and measure slack adjuster travel on the scale 90.
6. Turn "PRESSURE" switch 112 to "HIGH". Below each fixture is button 160. Hold the button 160 for 3 seconds and measure slack adjuster travel on the scale 90.
7. Activate actuator units until adapter plate 88 rests against the load cell 44. Measure force application.
8. Turn "PRESSURE" switch 112 to "OFF".
9. Turn "MODE" switch 118 to "AUTO".
10. Press "AUTO START" button 114.
11. On the diagnostics panel 20, the "TEST COMPLETE" light 150 will come on after the leakage test is complete. Check control panel 16 for red lights 102, 104 indicating failure of the leakage test on particular units.

The test stands 10 depicted in FIGS. 1–3 are designed to accept tread brake units for tests. It will be understood that disk brake cylinders have differently configured housings that generally require the disk actuator units to be mounted so that the piston is moveable in a vertical direction. It is within the scope of this invention to configure the disk brake test fixtures with suitable brackets and adapter plates for this type of vertical mounting, whereupon testing can then proceed utilizing the control and diagnostic panels 16, 20 and similar controls to initiate the same type of brake unit leakage and functional test procedures as outlined hereinabove in connection with tread brake units.

The logic used to conduct the aforementioned leakage and functional test procedures and control the actions of the valving and solenoid arrangements and the various displays embodied in the control and diagnostic panel displays 16, 20 is provided by the programmable logic controller 18, the programming of which will easily occur to software engineers of ordinary skill in the art from a review of the foregoing specification. Preferably, but not necessarily, the programmable logic controller 18 may utilize Rockwell software, such as RS Logix 500 (version 1.2).

The maximum pressure test preferably occurs at 90 psi. The high pressure leakage test preferably occurs at 60 psi while the low pressure leakage test occurs at 20 psi. The pressures may be varied in accordance with test operator preference by use of appropriate pressure regulators and reducer valves. By way of example only, the following brake unit leakage and functional test procedures may be used to test the WABCO GB 4-½ tread brake units:

1. Slack Adjuster Screw, Maximum Travel
   After applying all units to test stands, connecting air supply fittings 152 and prior to energizing any unit, the following test is to be performed on each unit:
   a) Mark slack adjuster nut and check maximum travel, distance "A" (113/4")
2. Slack Adjuster Travel
   With main panel AUTO/HAND selector switch 118 on HAND. Select LOW (20 PSI) on the pressure selector switch 112. Individually check each unit 14 being tested as follows:
   a) Mark slack adjuster nut on all units to indicate position.
   b) Energize SLACK ADJUSTER TEST switch on the test stand (unit will cycle 22 times), note: slack adjuster stop must have made 1 complete revolution.
   c) Manually back off slack adjuster nut.
3. Maximum Pressure Test
   With main panel AUTO/HAND selector switch 118 on HAND. Select HIGH (116 PSI) on the pressure selector switch 112. Keep the HIGH pressure switch energized until all units have reached maximum pressure (approximately 90–116 PSI). Note reading of each unit on digital readouts 100.
4. Piston Travel
   With main panel AUTO/HAND selector switch 118 on HAND. Select LOW (20 PSI) on the pressure selector switch 112. Individually check each unit being tested as follows:
   a) Note position of moveable block 86 using the scale 90 on test stand. Individually energize each unit, use the extend/retract switch (not shown) located adjacent to each test stand.
   Note position of the moveable block 86 extended and retracted. The travel of the moveable block for each cycle (extended/retracted) must be ¾" minimum to 1" maximum.
   b) With unit in fully released position, note: cam roller must move freely on the cam roller pin.
5. Pressure leakage tests (AUTO)
   a) Units will be energized with 20 PSI.
   b) Units will set for 30 seconds after they are charged to allow air to stabilize.
   c) Units will be tested for leakage. Cylinder pressure shall not drop by more than 0.5 PSI in 2 minutes.
   d) Units will be de-energized.
   e) Units will be energized with 60 PSI.
   f) Units will set for 30 seconds after they are charged to allow air to stabilize.
   g) Units will be tested for leakage. Cylinder pressure shall not drop by more than 0.5 PSI in 5 minutes.
   g) Test Pressures can be monitored on the digital readout on main test panel.
   I) Results of tests for each unit will be designated by lights located on main test panel.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. Apparatus for testing brake actuator units for use in railway cars, comprising:
   a. a test stand;
   b. a plurality of differently sized sets of brackets to which a brake actuator unit is mounted to one of said sets;
   c. control means for applying pressurized air to the brake actuator unit and monitoring for pressure drop indicative of air leakage within a cylinder of said actuator unit; and
   d. means, responsive to a signal from the control means, for identifying whether a predetermined amount of leakage is present.

2. Apparatus of claim 1, wherein said control means includes means for selectively applying a predetermined low pressure and a predetermined high pressure to said cylinder to establish a low leakage test and a high leakage test, respectively.

3. Apparatus of claim 2, wherein said selectively applying means applies a predetermined maximum pressure to establish a maximum pressure leakage test.

4. Apparatus of claim 2, wherein said selectively applying means includes an air circuit having a source of pressurized air connected to the cylinder through a pressure regulator and a directional valve, said pressure regulator regulating the pressure to a desired level and said directional valve being moveable between open, closed and exhaust positions.

5. Apparatus of claim 1, further comprising a plurality of test stands for respectively testing a plurality of brake actuator units, and said control means enabling pressurized air to be supplied to selected ones of said cylinders of the respective units being tested.

6. Apparatus of claim 1, wherein said control means includes a pressure transducer for monitoring the pressure supplied to the cylinder, said pressure transducer being connected to a display meter which actuates a programmable logic controller (PLC) which in turn actuates the identifying means when predetermined leakage is present.

7. Apparatus of claim 1, wherein said differently sized sets of brackets each include different pairs of upper and lower brackets positioned on the test stand for direct alignment and attachment with mounting locations formed on a housing of said brake actuator unit.

8. Apparatus of claim 1, further comprising a load cell mounted to the test stand in operative alignment with a cylinder actuated component of the brake actuator unit to measure application of force of said component under extension by said pressurized air.

9. Apparatus of claim 8, further comprises a gauge and an indicator connected to the test stand and the cylinder actuated component to measure slack travel of said component.

10. Apparatus of claim 1, wherein said control means is operable in automatic and manual modes of operation.

11. Apparatus of claim 2, said control means further comprising a programmable logic controller and a diagnostic panel display, connected to said programmable logic controller, said diagnostic display panel including indicia for indicating the type of pressure test being conducted and further indicia indicating whether or not leakage occurs following completion of said pressure test.

12. Apparatus of claim 11, further comprising a control panel display connected to the programmable logic controller and including indicia representative of whether a unit under test has passed or failed the leakage test at said high and low pressure levels.

13. Apparatus for testing brake actuator units for use in railway cars, comprising:
   a. a test stand;
   b. a mounting bracket set located on said test stand to mount the brake actuator unit to the stand;
   c. control means for applying pressurized air to the brake actuator unit and monitoring for pressure drop indicative of air leakage within a cylinder of said actuator unit; and
   d. means, responsive to a signal from the control means, for identifying whether a predetermined amount of leakage is present.

14. Apparatus of claim 13, further comprising a plurality of differently sized sets of brackets to which a brake actuator unit is mounted to one of said sets, whereby said differently sized sets enable brake actuator units of different manufacturers with different mounting holes to be mounted to the same test stand.

15. Apparatus of claim 13, wherein said brake actuator unit is a disk brake actuator and said mounting bracket set is arranged to directly bolt to a housing of said brake actuator unit with a cylinder actuated component part of said unit being moveable in a vertical direction on said test stand.

16. Apparatus for testing brake actuator units for use in railway cars, comprising:
   a. a test stand;
   b. mounting brackets attached to said test stand to mount said brake actuator unit on said stand;
   c. control means for applying pressurized air to the brake actuator unit to extend a cylinder actuated component thereof;
   d. a load cell mounted to the test stand to contact the component in an extended condition thereof said load cell being connected to means for displaying an application force of said component against said load cell.

17. Apparatus for testing brake actuator units for use in railway cars, comprising:
   a. a test stand;
   b. mounting brackets attached to said test stand to mount said brake actuator unit on said stand;
   c. a control system operatively arranged to apply pressurized air to the brake actuator unit to extend a cylinder actuated component thereof; and
   d. a load cell mounted to the test stand to contact the component in an extended condition therewith, said load cell being connected to a display for displaying an application force of said component against said load cell.

18. Apparatus for testing brake actuator units for use in railway cars, comprising:
   a. a test stand;
   b. mounting brackets located on said test stand to mount the brake actuator unit to the stand; and
   c. a control arrangement for applying pressurized air to the brake actuator unit and monitoring for pressure drop indicative of air leakage within a cylinder of said actuator unit, said control arrangement including an air circuit having a source of pressurized air connected to the cylinder through a pressure regulator and a directional valve, said pressure regulator regulating the pressure to a desired level and said directional valve being movable between open, closed and exhaust positions.

19. Apparatus for testing brake actuator units for use in railway cars, comprising:

a. a test stand;

b. mounting brackets located on said test stand to mount the brake actuator unit to the stand;

c. a pressure transducer for monitoring the pressure supplied to the cylinder; and d. a display meter to which the pressure transducer is connected, and a programmable logic controller (PLC) adapted to be actuated by said display meter which in turn actuates an identifying arrangement when predetermined leakage is present.

20. Apparatus for testing brake actuator units for use in railway cars, comprising:

a. a test stand;

b. mounting brackets located on said test stand to mount the brake actuator unit to the stand;

c. a control arrangement for applying pressurized air to the brake actuator unit and monitoring for pressure drop indicative of air leakage within a cylinder of said actuator unit;

d. an identifying arrangement, responsive to a signal from the control arrangement, for identifying whether a predetermined amount of leakage is present; and e. a load cell mounted to the test stand in operative alignment with a cylinder actuated component of the brake actuator unit to measure application of force of said component under extension by said pressurized air.

21. Apparatus of claim 20, further comprising a gauge and an indicator connected to the test stand and the cylinder actuated component to measure slack travel of said component.

22. Apparatus for testing brake actuator units for use in railway cars, comprising:

a. a test stand;

b. mounting brackets located on said test stand to mount the brake actuator unit to the stand; and c. a control arrangement for applying pressurized air to the brake actuator unit and monitoring for pressure drop indicative of air leakage within a cylinder of said actuator unit, said control arrangement further comprising a programmable logic controller and a diagnostic panel display, connected to said programmable logic controller, said diagnostic display panel including indicia for indicating the type of pressure test being conducted and further indicia indicating whether or not leakage occurs following completion of said pressure test.

23. Apparatus of claim 22, further comprising a control panel display connected to the programmable logic controller and including indicia representative of whether a unit under test has passed or failed the leakage test at both high and low pressure levels.

* * * * *